Inventor
A. Johnston

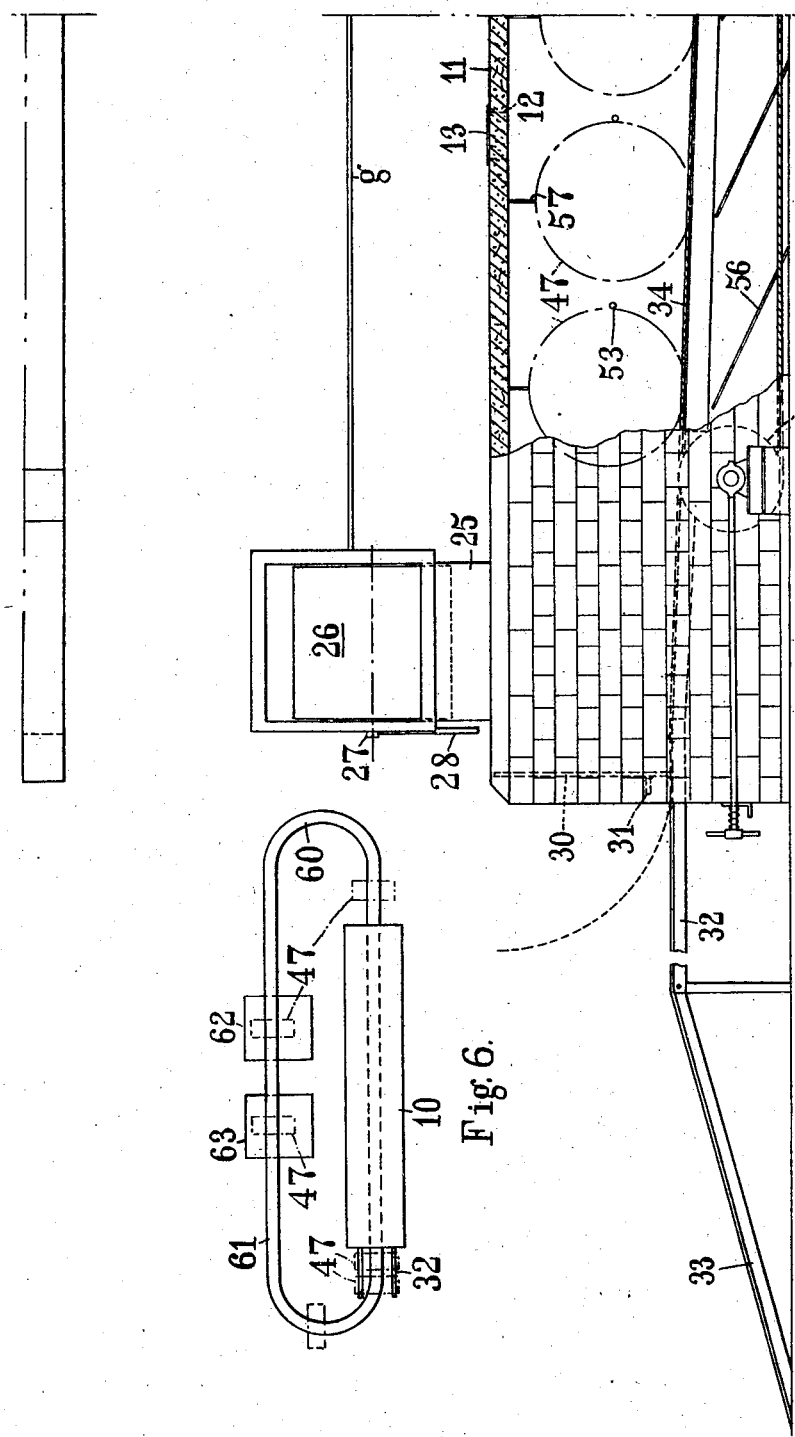

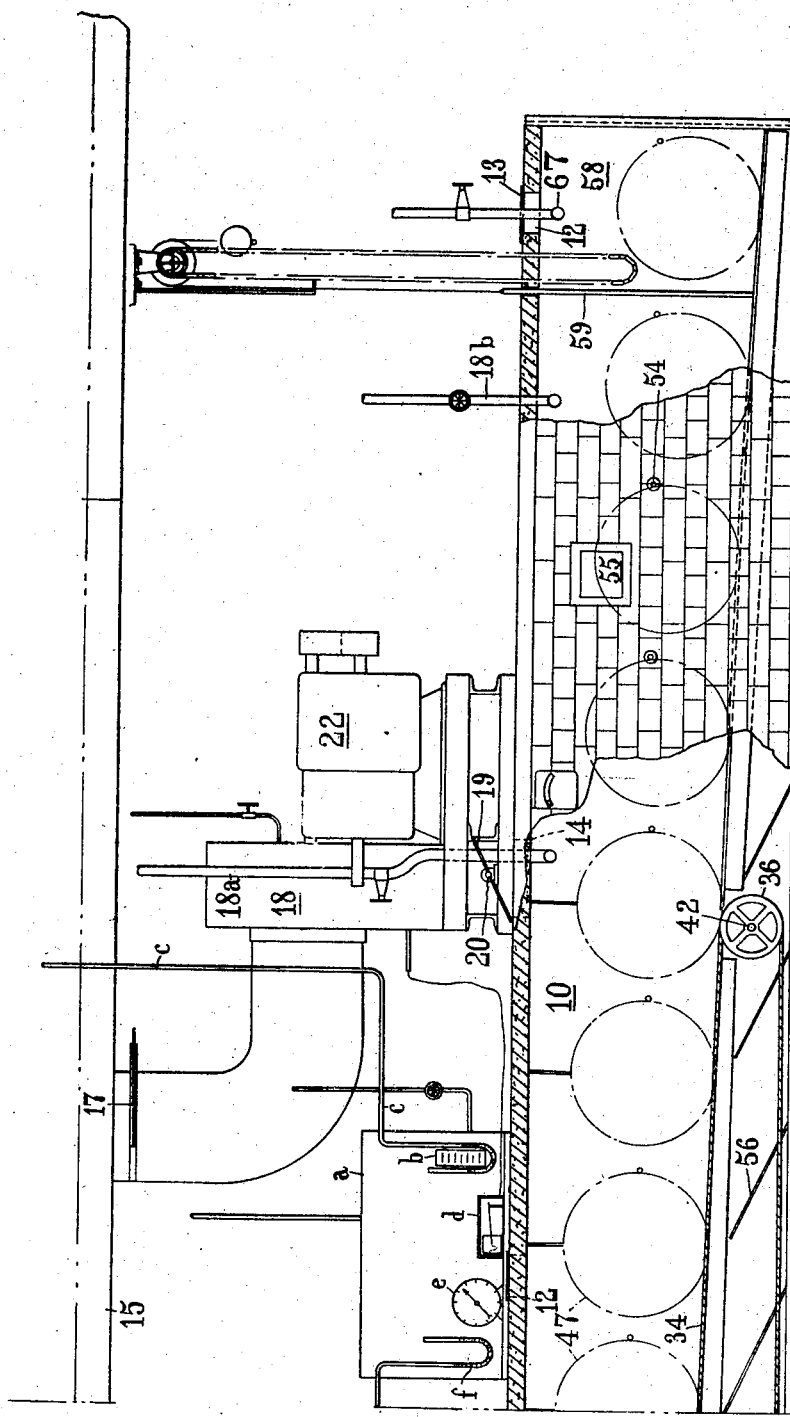

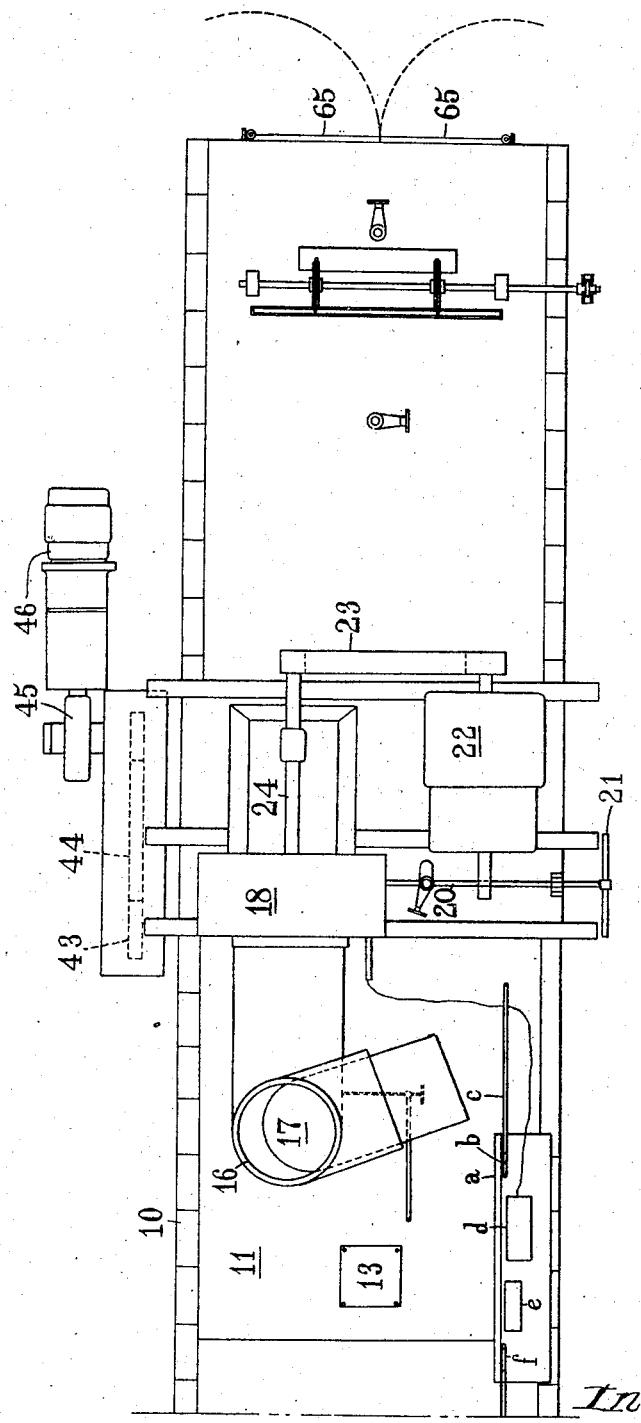

Aug. 20, 1946. A. JOHNSTON 2,406,297
REGENERATION OF WASTE RUBBER
Original Filed Nov. 12, 1942 5 Sheets-Sheet 5

Inventor
A. Johnston
By Glascock Downing Seebold
Attys.

Patented Aug. 20, 1946

2,406,297

UNITED STATES PATENT OFFICE 2,406,297

REGENERATION OF WASTE RUBBER

Alexander Johnston, Edinburgh, Scotland, assignor to The North British Rubber Company Limited, Edinburgh, Scotland Original application November 12, 1942, Serial No. 465,400. Divided and this application January 7, 1944, Serial No. 517,412. In Great Britain March 3, 1942

8 Claims. (Cl. 18—2)

This invention relates to the regeneration or reclaiming of vulcanised waste rubber and/or vulcanised waste rubber containing fibrous material, so that it may be re-used for manufacturing goods or articles.

In my co-pending application Serial No. 465,400, from which the present application is divided out, I have described a process for regenerating or reclaiming waste rubber, which involves the use of flue or exhaust gas for such a purpose, and the object of the present invention is an apparatus by which the use and the effect of such gases is effectively realised.

A further object of the invention is to so carry on the operation that there is no danger of fire during the treatment.

Reference will now be made to the accompanying drawings which illustrate by way of example two forms of apparatus by which the invention may be carried into effect.

Figures 1 and 1a show in two portions an elevation partly in section of a tunnel apparatus through which flue gas is passed in countercurrent to the passage of the waste rubber to be treated.

Figures 2 and 2a constitute a plan view in two portions similar to Figure 1.

Figure 4 shows a perspective view of a form of open mesh container hereinafter referred to.

Figure 6 is a diagrammatic plan view of the plant with a modified unloading and reloading system.

Figure 2:
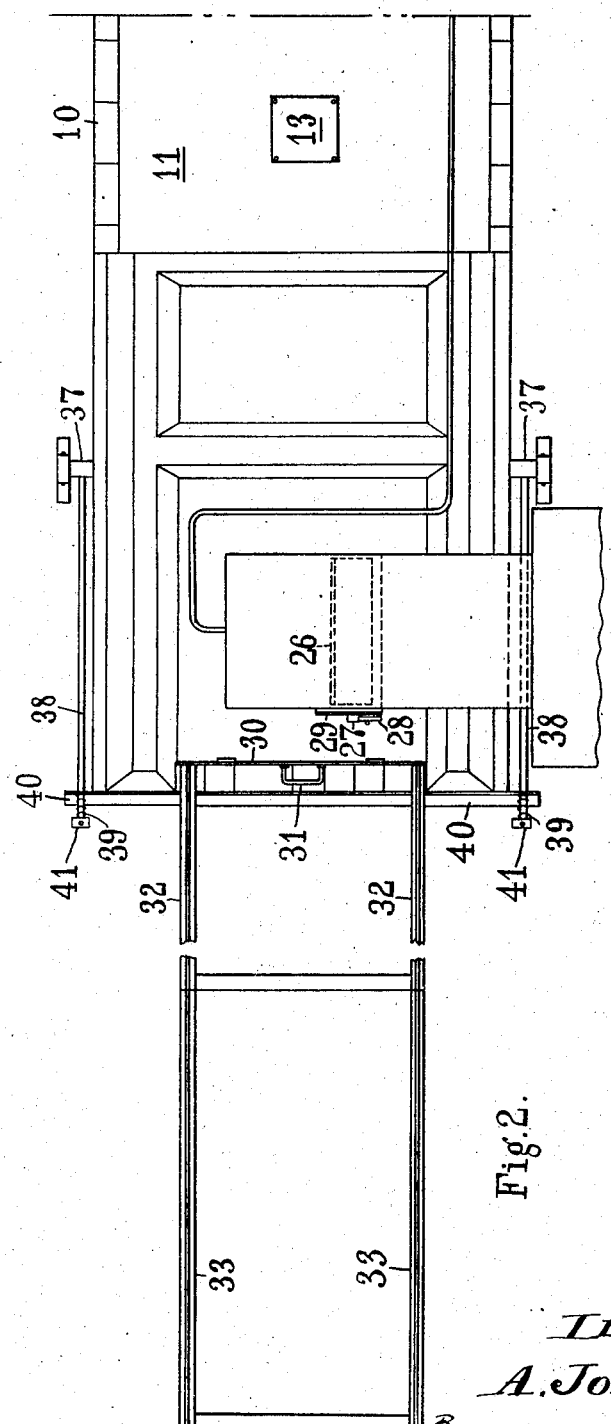
Figure 3:
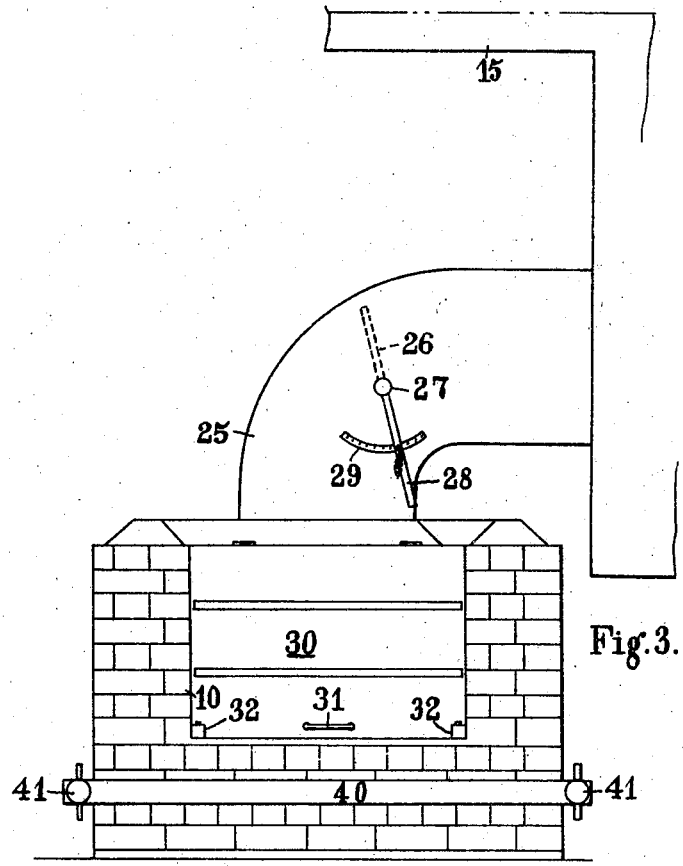
Figure 3 is an end elevation of Figure 1.

Referring to Figures 1 and 1a, 2 and 2a and 3, the apparatus comprises a tunnel 10 of brickwork or other refractory material and the top of the tunnel may be formed by a series of concrete slabs 11 which may be reinforced in the usual way, and may each be adapted for removal, as will hereinafter appear, each being fitted with an inspection opening 12 closed by a transparent or other suitable plate 13. Towards one end of the tunnel, an inlet 14 is provided in the top by which a portion of the ordinary flue gases passing away to a factory chimney through a flue indicated at 15, is diverted through an elbow duct 16, controlled by damper 17, and drawn into a casing 18 in which a fan (not shown) delivers the flue gases through the inlet 14 into the tunnel. The inlet 14 is preferably also provided with a damper 19 mounted on a shaft 20 which may be externally controlled by a cross handle 21. The fan is driven by an electric motor or other prime mover 22, through a belt drive 23 and fan shaft 24, but any other drive may be used.

The flue gases forced into the tunnel, travel therethrough towards its left-hand end where they are carried away by the draught of, and through an elbow duct 25 back to, the main flue 15 or otherwise, under the control of a damper 26 mounted on shaft 27 and operated externally by a lever 28 which is adjusted relatively to a fixed quadrant 29 or in any other suitable way. It is not necessary to use the whole of the flue gases since a portion only thereof may be diverted for the purposes of this invention.

The plant is preferably so designed that the regulation of the tunnel temperature may be controlled by the variation of the fan draught; by the re-circulation of the used flue gases; by the admission of cooled flue gases after passing through the usual heat economiser or by other suitable means; or by the admission of heated gases from any suitable source. The temperature is preferably controlled thermostatically by any suitable means.

For these and other purposes various recording instruments are arranged in a casing a on the tunnel as shown by way of example in Figure 1. Thus b indicates a manometer gauge which is in communication by a duct c with the main flue 15 passing to the chimney. d is a temperature recorder; e is a clock to time the various steps in the process and f is a manometer which is in communication by the duct g with the outlet duct 25.

The composition of the gas may be controlled or varied by the admission of air on the one hand, or by nitrogen, carbon dioxide or other inert gas on the other hand, by means of special inlets in the ducting leading to the channel.

The left-hand end of the tunnel is closed preferably airtight by a door 30, hinged along its upper edge, and fitted with a handle 31. Arranged at a convenient height within the inlet of the tunnel and projecting outside thereof is a pair of rails 32 which forms a loading platform and from which a ramp 33 extends downwardly to the floor level.

Adjacent to the bottom of the tunnel is arranged an inclined moving track which may consist of one or more endless wire ropes or sprocket chains 34 which pass round a pulley or pulleys 35, 36 at each end respectively. The upper stretch of the wire ropes is at one end on a level with the rails 32, and the pulleys 35 are mounted on movable bearings extending through each side of the tunnel where the projecting ends of the pulley shaft 37 are under the control of external tensioning rods 38 fitted at one end with springs 39 by which the wire ropes are tensioned, the springs 38 pressing at one end against a cross bar 40, and at the other against a head 41 on each tensioning rod. The endless track is driven by the pulleys 36 at the other end which are mounted on a transverse shaft 42 one end of which is driven by a pulley 43, which in turn is actuated by a chain or other suitable drive 44 through worm or other gearing 45 from an electric motor or other prime mover 46.

It is to be noted that the pulley or pulleys 36 at one end of the moving trackway are smaller in diameter than the pulleys 35 at the other end, so that the upper stretch of the track has a downward slope from the doorway 30 at the mouth of the tunnel, and forms a constantly moving platform to support and progressively move through the tunnel in counter direction to the flow of the heated gases, a number of containers 47 which are cylindrical in shape and in which are placed the goods that are to be exposed to the heating treatment.

Figure 4:
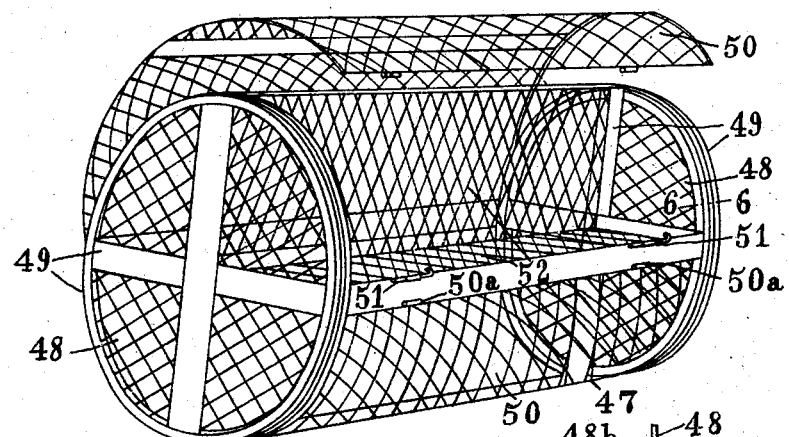
Figure 5:
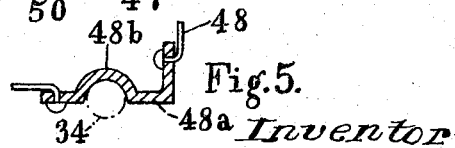
Figure 5 is a detail section taken on the line 6—6, Figure 4.

An example of one of the cylindrical containers 47 is shown in perspective in Figure 4. The container is constructed of stout wire mesh with ends 48 and reinforced by metal framing 49. The circular wall of the container is formed by or includes two semi-circular doors 50, each of which extends halfway round the container, and Figure 4 shows one of the doors in a partly open position. Each door is hinged at 50a on one side and locked at the other by suitable sliding or other catches 51. Each half of the container itself is divided into two compartments by open wire mesh partitions 52. The circular ends 48 have reinforced rings 48a formed with a groove 48b with which engages the wire rope 34, as shown in the detail view in Figure 5. Such a cage-like container ensures that the goods or material held therein will be thoroughly exposed to the action of the heated gas or gases.

A number of such cage-like containers 47 are rolled up the ramp 33 on to the loading platform 32 and admitted in turn into the open end of the tunnel through the door 30 at suitable intervals.

The loading and the unloading of the containers may alternatively be effected by a conveyor system such as is diagrammatically illustrated by way of example in Figure 6. This comprises an overhead runway which commences at the outlet end of the tunnel 10 and makes a half turn circuit 60 on to a return path 61 and extends through another half-turn at 61a to the inlet end. The runway is provided with any usual form of suspension block and tackle and a quick acting grip, not shown.

As a container 47 shown in dotted lines leaves the tunnel it is carried round the loop 60 on to the return path 61 to a suitable deck 62 at which it and all the containers in turn are unloaded. From this deck the empty containers are picked up in turn and moved forward to a second deck 63 where they are re-loaded with stock ready to be reclaimed. They are then carried on round the loop 61a and lowered on to the loading platform 32 at the tunnel inlet to await processing.

After entering the tunnel, the containers are supported on the upper stretch of the moving track 34, the various containers being kept separated from one another by cross pins 53 which make contact with the end rims of the containers 47 inserted through holes 54 in the opposite sides of the tunnel, and two of which are seen in Figure 1. A number of inspection windows such as 55 are provided in the side walls of the tunnel. Due to the moving endless track each container is rotated on its own axis and is also allowed to progress intermittently along the tunnel down the slope of the track by temporarily removing the pins 53.

As already stated the containers travel along the tunnel against the flow of the heating gases and as they are continuously rotating, the goods contained therein are thoroughly exposed to the action of the gas. The space beneath the containers is fitted with a series of baffle plates 56 which slope upwards from the bottom of the tunnel so that the gas at the bottom is forced upward to impinge on the containers and thus prevent any tendency for the gas to by-pass the containers.

With the same object in view, a series of hinged baffle plates 57 depend from the top of the tunnel each being in such a position that when the containers come to rest against the pins 53 the baffles 57 are immediately over the centre of each container. These baffle plates vary in length due to the slope of the track.

The length of the tunnel is preferably such that the distance between the inlet door 30 and the gas inlet 14, is sufficient to progressively treat a number of containers, for example six as shown. In order to cool the materials being heated, to assist in the separation of rubber portions from those of rubber and fabric, and to guard against possible damage by fire, a steam pipe 18a which extends across the full width of the tunnel is positioned at the gas inlet 14 so that the steam impinges on the material when it is at its highest temperature. The tunnel then continues for a further distance to provide a cooling zone which may contain three containers at a time, for example, and it is fitted with a steam pipe 18b which is similar to the steam pipe 18a and which assists in the cooling of the heated rubber product, as well as preventing danger of fire. The bottom of this zone is formed with a fixed slope indicated at 57a. Finally the tunnel terminates in a gas lock or discharge compartment 58, the entry into and the exit from which are controlled by any suitable type of sliding self-sealing door 59, either manually or mechanically operated.

Such gas lock or discharge compartment will completely isolate the container within it to allow a further period for cooling. When the material is sufficiently cooled the end door 65 is opened to allow the container to be removed, the inlet door 59 being at the same time closed. By such an arrangement not only will any unnecessary escape of heat from the tunnel be prevented, but any inrush of atmospheric air or risk of fire will be prevented by the isolation of the compartment. Further, to prevent any danger of fire, the compartment as shown is fitted with a water spray or steam jet 67.

Finally, the general temperature of the main tunnel, as well as that of the cooling zone, may be controlled by any usual form of thermostatic device or devices, which as being well known in many forms it is not herein illustrated.

It should be emphasized that the material being heated in the tunnel device is under constant inspection and control all the time it is passing through the tunnel and that the duration of treatment may be varied by suitable manipulation of the pins 53.

The tunnel as described is made of refractory brick and concrete slabs with or without metallic sheathing and is preferably insulated sufficiently so that the heat loss of the gases is as low as possible. This is particularly desirable where the gases leaving the tunnel are returned to the main flue before entering an economiser. The tunnel may however be constructed of sheet metal or any other suitable metal which would similarly be efficiently insulated.

It is to be understood that the treatment according to the present invention does not involve any material consumption of power, and that the gases preferably used are readily obtainable inasmuch as they are waste gases and that no high pressures are necessary.

I claim:

1. Apparatus for reclaiming and regenerating waste rubber comprising in combination a tunnel-like casing divided into heated and cooled zones, a discharging compartment at the outer end of the cooled zone, an entrance at the end of the tunnel remote from the cooled zone, means for passing a stream of heated inert exhaust gases through the heated zone from the inner end thereof and toward the entrance end of the tunnel, an inclined trackway in the bottom of the tunnel throughout the length thereof, at least that portion of the trackway in the heated zone being movable in a direction longitudinally of the tunnel-like casing, means for moving said trackway, a series of cylindrical perforated containers for waste rubber supported on and in rolling contact with the trackway and movable through the tunnel-like casing from the entrance end through the heated and cooled zones and successively into the discharging compartment, means for isolating the discharging compartment when a container is to be discharged and means for temporarily arresting movement of the containers through the tunnel whereby rotary movement is imparted to the containers by engagement with the movable trackway.

2. Apparatus for reclaiming and regenerating waste rubber comprising in combination a tunnel-like casing provided with an entrance and with a discharging compartment, a damper controlled inlet for admitting a stream of heated inert flue exhaust gases at a point medially of the ends of the casing, a controlled outlet for such gases near the entrance end of the tunnel, a trackway on the floor of the tunnel sloping toward the gas inlet and movable in a direction longitudinally of the tunnel-like casing, means for moving the trackway, a series of perforated cylindrical containers for waste rubber supported on and in rolling contact with the trackway and moved by the latter through the tunnel in a direction opposite to the flow of gases, means for intermittently stopping the containers in their travel through the tunnel whereby rotary movement is imparted to the containers by their engagement with the driven trackway.

3. Apparatus as claimed in claim 2 in which the means for intermittently stopping the containers in their travel through the tunnel include a plurality of rods adapted to be extended across the tunnel to stop the passage of the containers through the tunnel but allowing them to rotate on their own axes.

4. Apparatus for reclaiming and regenerating waste rubber as claimed in claim 2 wherein a number of upwardly sloping baffle plates are spaced along the floor of the tunnel and beneath the moving trackway to divert the heated gases upwardly and a number of uniformly spaced transverse baffle plates swingably suspended from the roof of the tunnel for making successive contact with the upper parts of the passing rotating containers to substantially divide the tunnel into compartments and insure of the passage of the gases directly through the rotating containers.

5. Apparatus for reclaiming and regenerating waste rubber comprising in combination a tunnel-like casing having an entrance at one end and a discharge compartment at the other, and having a cooling zone near the discharging compartment and a heating zone near the entrance and through which flows a stream of heated inert flue exhaust gases towards the entrance, a reticulated trackway near the floor of the casing in the heating zone and inclined downwardly from the entrance end and movable longitudinally of the casing, means for moving the trackway, a correspondingly inclined floor in the cooling zone, a series of removable perforated cylindrical containers supported transversely on and in rolling contact with movable trackway and inclined floor for receiving the waste rubber in finely divided pieces, said inclined floor acting to rotate the containers as they pass down the floor, and means for temporarily retaining the containers in set positions within the desired portions of the casing for a predetermined period of time, and the movable trackway in the heated zone acting to insure rotation of the containers about their own axes due to the rolling contact of the container therewith.

6. Apparatus for reclaiming and regenerating waste rubber as claimed in claim 5 wherein a series of uniformly spaced transverse baffle plates depend from the top of the casing to divide the heated zone into a plurality of compartments, said baffle plates terminating at the uppermost surface of the containers so that the flue gases are compelled to pass through the containers and a series of upwardly inclined baffles co-operating with the partitions and rising from the floor of the casing to the under surface of the movable trackway to insure the passage of the gases from one compartment to the other only through the containers.

7. Apparatus for reclaiming and regenerating waste rubber comprising a combination with a tunnel as claimed in claim 2 of an external runway extending from the discharging end of the tunnel then curved and extended in parallel relation to the tunnel and finally curved and extended back to the entrance end of the tunnel in such a manner that the runway and tunnel form a substantial loop, a loading and unloading dock at about the center of the runway opposite the tunnel so that each container with the finished goods may be moved from the tunnel around the runway and unloaded and then refilled with stock to be treated and then moved around to the tunnel inlet.

8. Apparatus as claimed in claim 2 in which each of the cylindrical containers comprises end plates and sides of open mesh work having internal partitions of open mesh work forming a number of compartments therein and portions of the sides being in the form of hinged doors by which waste rubber may be passed into or withdrawn from the compartments.

ALEXANDER JOHNSTON.